United States Patent [19]

Deck

[11] Patent Number: 4,870,290

[45] Date of Patent: Sep. 26, 1989

[54] OBJECT MOTION SENSING AND MEASURING APPARATUS USING POSITION SENSING DETECTORS

[75] Inventor: Leslie L. Deck, Hennepin, Minn.

[73] Assignee: Honeywell Inc., Minneapolis, Minn.

[21] Appl. No.: 249,142

[22] Filed: Sep. 26, 1988

[51] Int. Cl.[4] .............................................. G01N 21/86
[52] U.S. Cl. ................................. 250/561; 250/231 R; 356/152; 89/41.06
[58] Field of Search ............. 250/231 R, 561; 73/653; 33/286; 89/41.06; 356/141, 152

[56] References Cited

U.S. PATENT DOCUMENTS

| | | | |
|---|---|---|---|
| 2,343,063 | 2/1944 | Kent | 73/653 |
| 2,729,975 | 1/1956 | Hawthorne et al. | 73/167 |
| 3,181,355 | 5/1965 | Dallas et al. | 73/167 |
| 3,504,543 | 4/1970 | Cutting | 73/342 |
| 3,733,134 | 5/1973 | Kadoya | 356/152 |
| 3,766,826 | 10/1973 | Salomonsson | 89/41.06 |
| 3,770,353 | 11/1973 | Brown et al. | 356/152 |
| 3,989,384 | 11/1976 | Friedman | 356/152 |
| 4,069,702 | 1/1978 | Hayner | 73/11 |
| 4,142,799 | 3/1979 | Barton | 33/286 |
| 4,155,647 | 5/1979 | Michel | 356/28 |
| 4,334,775 | 6/1982 | Breecher et al. | 356/152 |
| 4,365,149 | 12/1982 | Falbel | 89/41.06 |
| 4,425,043 | 1/1984 | van Rosmalen | 356/375 |
| 4,618,259 | 10/1986 | Czichy et al. | 356/152 |
| 4,665,795 | 5/1987 | Carbonneau et al. | 89/41.03 |
| 4,676,636 | 6/1987 | Bridges et al. | 33/286 |
| 4,685,804 | 8/1987 | Kugler et al. | 73/653 |
| 4,792,931 | 12/1988 | Nishida et al. | 73/653 |

Primary Examiner—David C. Nelms
Assistant Examiner—Stephone B. Allen
Attorney, Agent, or Firm—Minneapolis, MN 55440; Roger W. Jensen

[57] ABSTRACT

An apparatus for sensing and measuring translational and rotational motion of an object, such as a gun barrel during a firing event, includes a pair of support boards attached in orthgonal relation on the object and a pair of elongated position sensitive detectors mounted in spaced relation to one another and in a common plane on each of the boards. The detectors have respective light sensitive axes oriented parallel. Also, electrical circuits are coupled to the detectors to produce bipolar output signals representative of the magnitude and direction of displacement of the positions of planar light beam impingement across the detector axes from zero rest positions thereon such that separate measurements of translational motion and rotational motion of the object with respect to imaginary axes extending through the zero rest positions of and perpendicular to the sensitive axes of the pairs of detectors can be derived therefrom. Laser assemblies are provided for generating stationary planar beams of light aligned to impinge across the light sensitive axes of the pairs of positive sensitive detectors along their imaginary axes when the object whose motion is to be sensed and measured is at rest.

15 Claims, 4 Drawing Sheets

PURE ROTATIONAL MOTION

PURE ROTATIONAL MOTION

OBJECT MOTION SENSING AND MEASURING APPARATUS USING POSITION SENSING DETECTORS

BACKGROUND OF THE INVENTION

1. Field of the Invention

The present invention generally relates to motion sensing and, more particularly, is concerned with an apparatus for sensing and accurately measuring translational and rotational motion of an object, such as a gun barrel during a firing event.

2. Description of the Prior Art

There are three distinct successive phases spanning from initial firing to final impact of a projectile which contribute to any observed dispersion or error in the accuracy of the projectile reaching the desired impact point. They are acceleration, transition and ballistic phases. The acceleration phase spans the initial period when the projectile is traveling down the gun barrel and the ballistic phase spans the period from when the projectile achieves free flight until it reaches impact. The transition phase spans the period from when the projectile leaves the barrel until it reaches free flight.

The measurement of factors contributing to error in projectile accuracy during the ballistic phase is well known and described in the prior art. However, in the prior art, measurements of contributing factors are lacking with respect to the acceleration and transition phases. One strategy for reducing the number of unknowns is to gain a better understanding of the acceleration phase so that the effects of the acceleration and ballistic phases can then be subtracted from the observed dispersion to determine the effect of the transition phase which appears to be the most difficult phase to measure directly.

It is generally known that projectile accuracy is very dependent on the interaction of the projectile and the gun barrel in the acceleration phase, especially at ejection of the projectile from the barrel. A number of approaches have been devised in the prior art to measure this interaction, but each has its own drawbacks.

In one approach, accelerometers are mounted on the end of the gun barrel to measure lateral motion. However, such devices are plagued with noise due to cross-axis sensitivity and do not measure velocities or displacements very well due to the integration required. In another approach, noncontacting magnetic (proximity) sensors are used. However, they are cumbersome and almost impossible to employ at the muzzle exit if significant recoil is present since the sensors will then extend into the blast area. In still another approach, a laser and quadrant detector is used in combination with a mirror mounted at the muzzle end. While this approach gives the best accuracies, it cannot distinguish between lateral displacements and changes in the pointing angle of the gun barrel. There are additional drawbacks associated with each of these approaches; only the major ones have been mentioned.

Consequently, if the aforementioned strategy for gaining an understanding of what the contribution of the transition phase is to projectile dispersion, a need exists for a technique to measure gun barrel motion, especially at ejection of the projectile, during the acceleration phase.

SUMMARY OF THE INVENTION

The present invention provides an object motion sensing and measuring apparatus designed to satisfy the aforementioned needs. The apparatus is especially adapted, but not so limited, for measuring gun barrel muzzle motion during projectile firing and thereby for gaining a clearer understanding of the contribution of the acceleration phase to projectile dispersion.

More particularly, the apparatus accurately and automatically senses and measures the components of gun jump, i.e., translation and rotation (bending or pointing angle) motions, of the muzzle exit before, during and after projectile firing. The apparatus is able to distinguish between translation and rotation motions while measuring both. The apparatus uses simple, commercially available components and is inexpensive, lightweight and highly reliable. Its accuracy is an order of magnitude greater than a standard proximity sensor arrangement.

Accordingly, the present invention is directed to an object motion sensing and measuring apparatus which comprises: (a) a pair of light position sensing and signal generating means mounted on an object whose motion is to be sensed and measured, the pair of sensing and generating means defining generally parallel spaced apart light sensitive axes lying in a common plane and being responsive to impingement of a planar beam of light across the axes for generating a pair of output signals each representative of the magnitude and direction of displacement of the positions of impingement of the planar light beam across the sensitive axes relative to given zero rest positions on the axes such that separate measurements of translational motion and rotational motion of the object with respect to an imaginary axis extending through the zero rest positions of and perpendicular to the sensitive axes can bederived therefrom; and (b) means for generating a stationary planar beam of light aligned to impinge upon the pair of sensing and generating means across the light sensitive axes thereof and along the imaginary axis extending through the zero rest positions of the sensitive axes when the object whose motion is to be sensed and measured is at rest.

More particularly, the pair of sensing and generating means include a pair of elongated position sensitive detectors mountable in spaced relation to one another and in a common plane about the object. Each detector defines one light sensitive axis and a pair of electrical outputs located at opposite ends of the axis. Each detector is responsive to impingement of the planar beam of light across the axis for generating an electrical current in each detector which is divided proportionally between the outputs, depending upon the position of impingement of the planar light beam along the axis between the outputs, to produce a pair of input current signals at the outputs of each detector. Further, the pair of sensing and generating means include a pair of electrical circuits each having a pair of inputs coupled to the outputs of one of the position sensitive detectors for receiving the pairs of input signals from the detectors and transforming them into the pair of output signals.

These and other advantages and attainments of the present invention will become apparent to those skilled in the art upon a reading of the following detailed description when taken in conjunction with the drawing wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
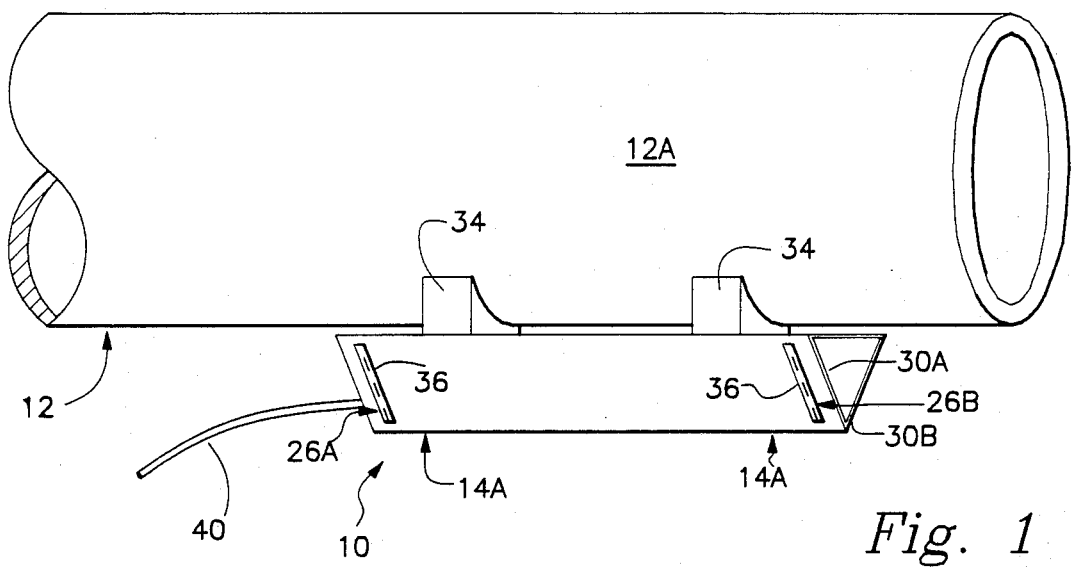
FIG. 1 is a fragmentary perspective view of the muzzle end of a gun barrel having components of a motion sensing and measuring apparatus of the present invention attached to the underside of the barrel.
Figure 2:
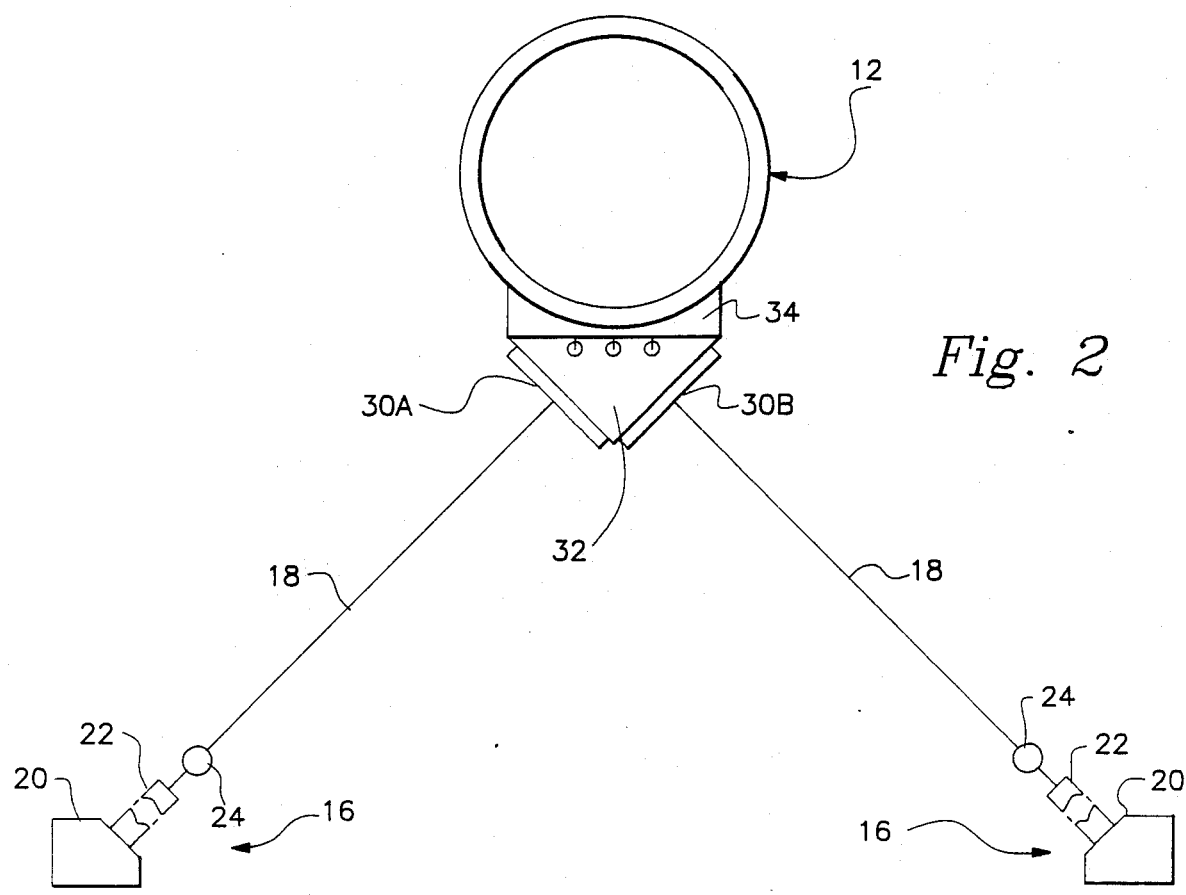
FIG. 2 is a schematical front elevational view of the gun barrel and the components of the measuring apparatus depicted in FIG. 1 along with a pair of laser assemblies which generate a pair of planar laser beams used in sensing and measuring motion of the gun barrel during firing of a projectile therefrom.
Figure 3:
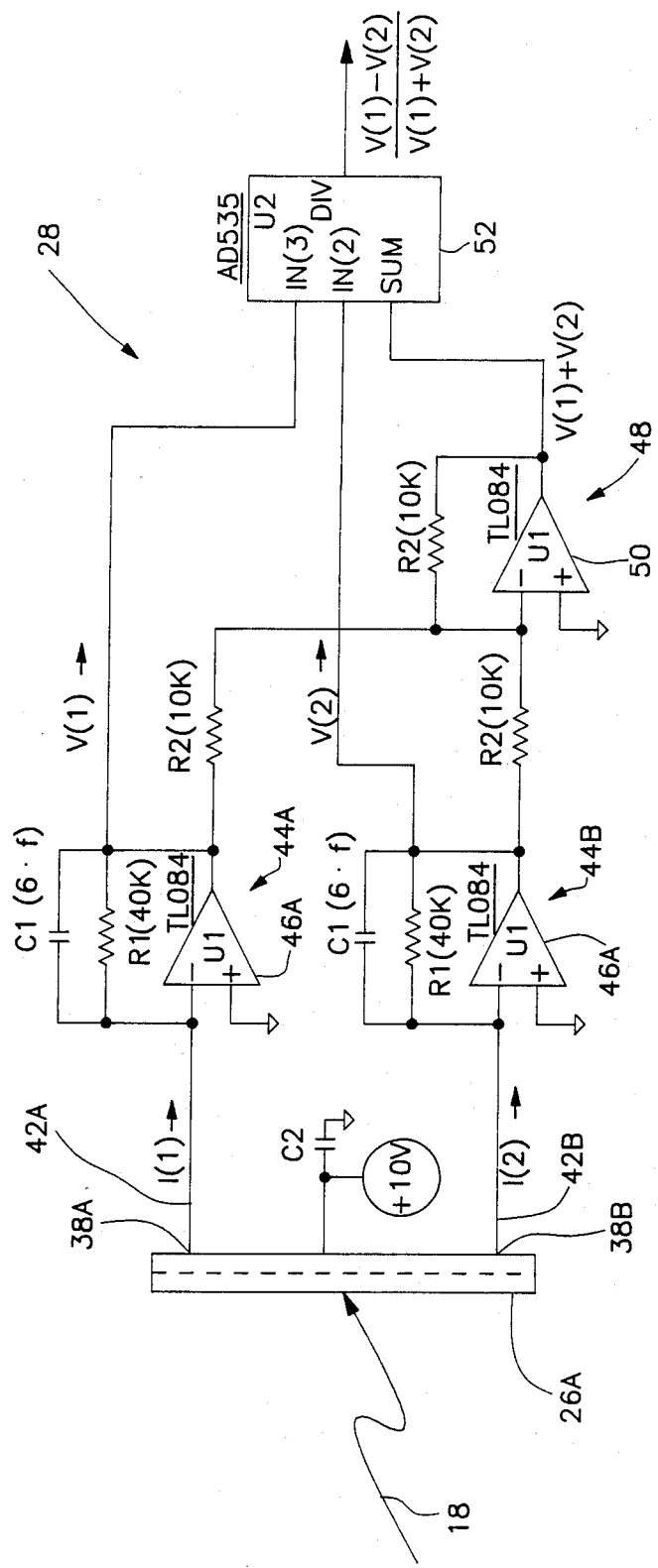
FIG. 3 is a schematical diagram of an electrical circuit coupled with each of a plurality of position sensitive detectors employed in the measuring apparatus.

Referring now to the drawings, and particularly to FIGS. 1 to 3, there is shown, in somewhat schematical form, an object motion measuring apparatus, generally designated by the numeral 10, for sensing and accurately measuring translational and rotational motion of an object, such as a gun barrel 12 at its muzzle end 12A occurring before, during and after a firing event, in accordance with the principles of the present invention. In its basic components, the measuring apparatus 10 includes at least one and, preferably, first and second pairs (only the first pair being shown in FIG. 1), of light position sensing and signal generating means 14A, 14B mounted on the gun barrel 12 whose motion is to be sensed and measured, and means in the form of at least one and, preferably, a pair of laser assemblies 16 for generating a pair of stationary planar beams of light 18 aligned to impinge upon the pairs of sensing and generating means 14A, 14B.

More particularly, as shown schematically in FIG. 2, each laser assembly 16 includes a stationary-supported base 20 having a laser 22, such as a solid state one, mounted thereon and a cylindrical lens 24 supported by suitable means (not shown) to intersect the laser beam and cause it to expand in one dimension to form a diverging planar beam 18. The laser 22 and lens 24 are oriented such that the axis of beam expansion, or the plane of the beam, is collinear with the axis of the gun barrel 12.

Each pair of sensing and generating means 14A, 14B of the apparatus 10 includes a pair of linear position sensitive detectors 26A, 26B and a pair of electrical circuits 28 (only one of which is shown in FIG. 3). The first and second pairs of sensing and generating means 14A, 14B are mounted respectively on a pair of generally planar circuitboards 30A, 30B which, in turn, are supported by a triangular-shaped platform 32 having a pair of spaced legs 34 attached, such as by dental cement, to the underside of the gun barrel exit end 12A. The circuitboards 30A, 30B are supported by the platform 32 in orthogonal relation to one another and contain the electrical circuits 28 thereon.

It should be understood at this point that because of the orthogonal relationship between the circuitboards 30A, 30B, the measurements of translational and rotational motions which are made by use of the detectors 26A, 26B and circuits 28 on one of the circuitboards 30A, 30B are totally independent from the measurements made on the other of the circuitboards. In other words, no cross-correlation exists between the sets of measurements made with respect to the two separate orthogonal axes.

More particularly, as best seen in FIG. 3, each of the linear position sensitive detectors 26A, 26B has a longitudinal light sensitive surface or axis 36 and a pair of electrical outputs 38A, 38B located generally at opposite ends of the sensitive axis 36. The detectors 26A, 26B are spaced apart, lie in the common plane of its respective one of the circuitboard 30A, 30B, and are oriented so that their respective sensitive axes 36 extend generally parallel to one another and orthogonal to the barrel axis. As seen in FIG. 1, the detectors 26A, 26B are located at opposite ends of the respective circuitboards 30A, 30B (only the detectors on the one circuitboard 30A being shown), for instance, at a distance of 10 cm from one another.

In such positions, each pair of the detectors 26A, 26B are illuminated with the planar laser beam 18 from one of the laser assemblies 16. The plane of the laser beam should be made thin at the detectors, although the actual thickness is not critical so long as it is thin compared to the length of the detector sensitive surface or axis 36. For example, in an actual model fabricated, the beams had a thickness of 100 microns a meter away from the laser and illuminated a stripe 100 mm in length, which was more than enough to cover the pair of detectors 26A, 26B simultaneously. For the detectors, commercial off-the-shelf items such as S1544 Hamamatsu Position Sensitive Detectors were used, having 1×12 mm sensitive surfaces or axes 36.

The makeup of each detector 26A, 26B is such that it responds to impingement of light in the planar beam 18 thereof across its sensitive axis 36 by generating an electrical current in itself which is proportionally divided between its outputs 38A, 38B, depending upon the position of impingement of the planar light beam along its sensitive axis 36 between its outputs. The divided electrical current is manifested by current signals I(1) and I(2) produced at the detector outputs 38A, 38B which, in turn, provide input signals to the circuit 28.

FIG. 3 illustrates a schematical diagram of the electrical circuit 28 coupled with each of the position senitive detectors 26A, 26B in the measuring apparatus 10. The function of each circuit 28 is to transform the input current signals from a given detector into an output voltage signal. The output signals are sent on a signal and power cable 40 (FIG. 1) to suitable analytical means, such as a digital storage scope or other high speed analog-to-digital system for recording and analysis.

Accordingly, each pair of the detectors 26A, 26B and the respective circuits 28 coupled thereto will generate a pair of output voltage signals. Each output voltage signal is representative of the magnitude and direction of displacement of the position of impingement of the planar light beam across the sensitive axis 36 of the one detector 26A from a given centrally-located zero rest position on the axis. As will be explained below, the output signal correlates to a distance along the sensitive axis from the rest position from which separate measurement of translational motion and rotational motion of the gun barrel 12 about its own axis can be derived.

FIG. 3 illustrates just one example of the circuit 28 that can be used with each of the position sensitive detectors 26A, 26B of the apparatus 10. The circuit 28 includes a pair of inputs 42A, 42B coupled to the outputs 38A, 38B of the respective one position sensitive detector 26A for receiving the pair of input current signals I(1), I(2) therefrom. Each circuit 28 also has a pair of trans-impedance amplifiers 44A, 44B, each including an op amp (U1) 46A, 46B with a capacitor C1 and resistor R1 connected in parallel to each other and in feedback relation between the output and negative input thereof, for translating the input current signals I(1), I(2) to first and second primary intermediate voltage signals V(1), V(2). The inputs 42A, 42B are connected to the negative inputs of the op amps 46A, 46B. The positive inputs of the op amps are connected to ground.

Further, each circuit 28 includes a summing amplifier 48, including an op amp (Ul) 50 with a resistor R2 connected in feedback relation between the output and negative input thereof, for adding the primary intermediate voltage signals V(1), V(2) to produce a first secondary intermediate voltage signal V(1)+V(2) representing the sum of the primary intermediate voltage signals. The negative input of the op amp 50 is connected to the outputs of both of the op amps 46A, 46B of the trans-impedance amplifiers 44A, 44B, whereas its positive input is connected to ground.

The electrical circuit further includes a voltage divider (U2) 52 having inputs IN(1), IN(2) and SUM which respectively receive the primary intermediate voltage signals V(1), V(2) and the first secondary intermediate voltage signal V(1)+V(2) from the outputs of amplifiers 44A, 44B and 48. The voltage divider 52 is operable for subtracting the primary intermediate voltage signals V(1), V(2) to form a second secondary intermediate voltage signal V(1)−V(2) representing the difference thereof and then for dividing the second secondary intermediate signal V(1)−V(2) by the first secondary intermediate signal V(1)+V(2) to produce the output difference voltage signal [V(1)−V(2)]/[V(1)+V(2)]. As mentioned previously, this output voltage signal correlates to the distance along the sensitive axis 36 of the position of light impingement from the zero rest position thereon.

An analysis is performed using these output voltage signals from the pair of circuits 28 associated with each pair of detectors 26A, 26B, such as after suitable analog-to-digital processing of the data stream, to derive the separate measurements of translational motion and rotational motion of the gun barrel 12 within the common plane of the detectors the 26A, 26B. The analysis consists of subtracting the "at rest" voltage offset from each point of the digitized data stream for each detector output signal, PSD(1) and PSD(2), and then forming two quantities, SUM and DIFF, SUM = [PSD(1) + PSD(2)]/2, and

DIFF = [PSD(1) − PSD(2)]/2 , on a point by point basis. SUM is directly related to the amount of pure translation (FIG. 4) experienced by the gun barrel 12 at that particular point in time. DIFF is directly related to a rotational (pointing angle) change after account is made of the known separation distance between the detectors 26A, 26B. It is thus seen how the motion of the detectors 26A, 26B with gun barrel relative to an imaginary axis extending through the zero rest positions and perpendicular to the sensitive axes 36 of the detectors is used to derive the translation and pointing motions of the barrel as a function of time.

Figure 4:
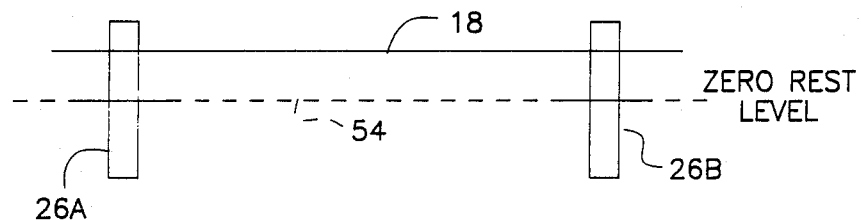
FIG. 4 is a diagram depicting at rest and displaced positions of one of the planar laser beams extending across a pair of the detectors of the apparatus as a result of pure translational motion of the gun barrel.
Figure 5:
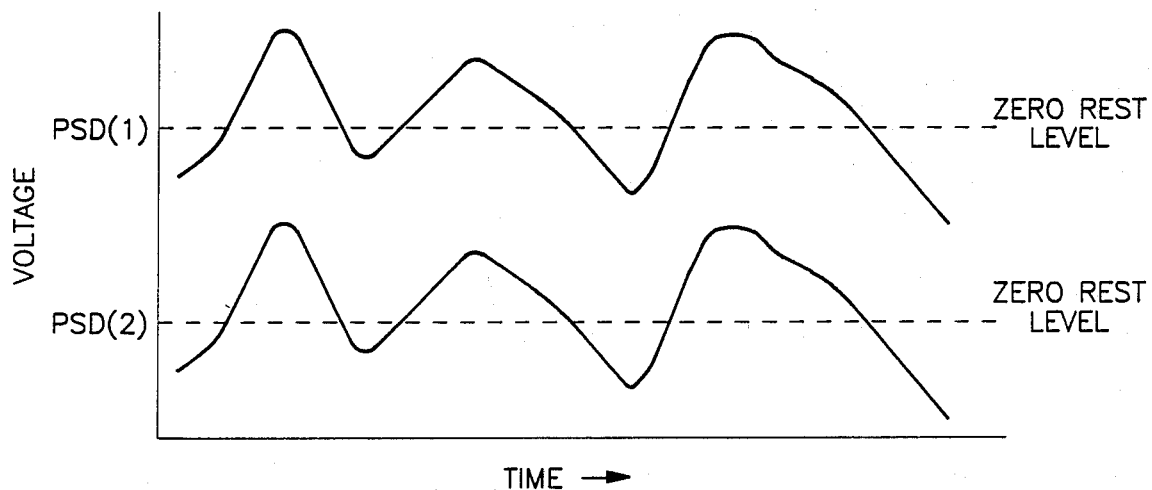
FIG. 5 is a graph depicting the output voltage signals produced by a pair of the circuits of FIG. 3 coupled with the pair of detectors schematically shown in FIG. 4 as a result of pure translational motion of the gun barrel.

FIG. 4 is a diagram depicting at rest and displaced positions of one planar laser beam 18 extending across the sensitive axes 36 of one pair of spaced detectors 26A, 26B of the apparatus 10 as a result of pure translational motion of the gun barrel 12. FIG. 5 is a graph depicting the output voltage signals produced by a pair of the circuits 28 of FIG. 3 coupled with the pair of detectors schematically shown in FIG. 4 as a result of pure time varying translational motion of the gun barrel above and below the imaginary axis 54 through the rest positions.

Figure 6:
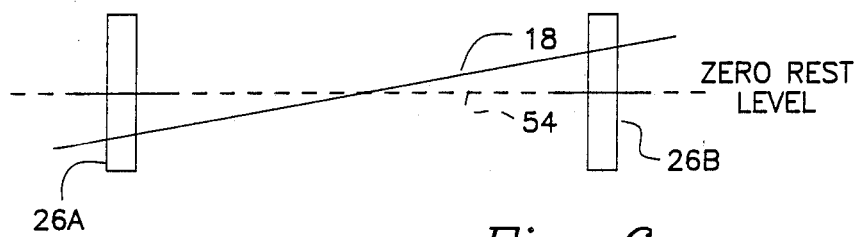
FIG. 6 is a diagram depicting at rest and displaced positions of one of the planar laser beams extending across a pair of the detectors of the apparatus as a result of pure rotational motion of the gun barrel.
Figure 7:
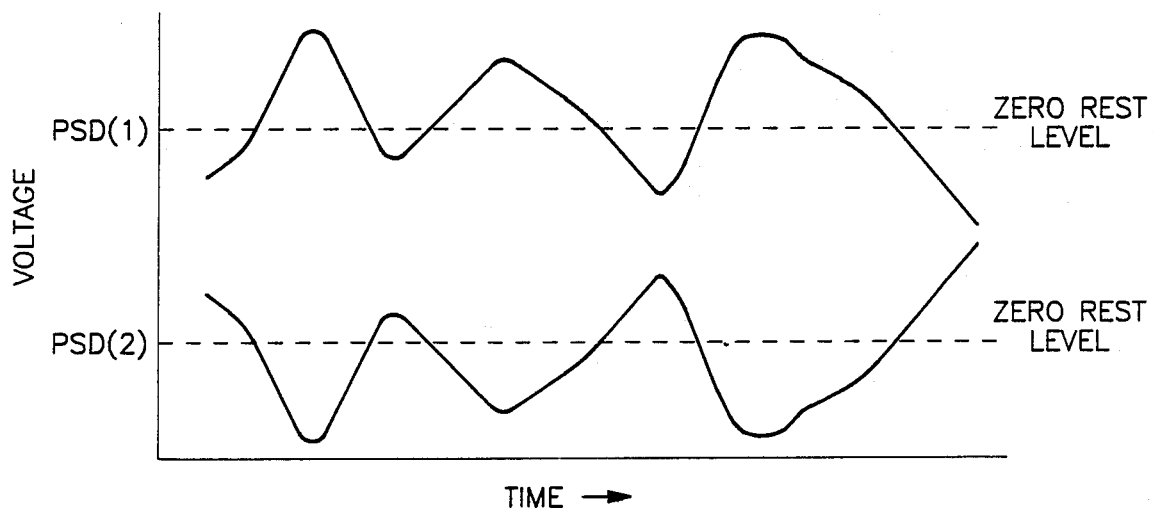
FIG. 7 is a graph depicting the output voltage signals produced by a pair of the circuits of FIG. 3 coupled with the pair of detectors schematically shown in FIG. 6 as a result of pure rotational motion of the gun barrel.

FIG. 6 is a diagram depicting at rest and displaced positions of one planar laser beam 18 extending across the sensitive axes 36 of one pair of detectors 26A, 26B of the apparatus 10 as a result of pure rotational motion of the gun barrel. FIG. 7 is a graph depicting the output voltage signals produced by a pair of the circuits 28 of FIG. 3 coupled with the pair of detectors schematically shown in FIG. 6 as a result of pure time varying rotational motion of the gun barrel relative to the imaginary axis 54 through the rest positions.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An object motion sensing and measuring apparatus, comprising:
    (a) a pair of light position sensing and signal generating means mountable on an object whose motion is to be sensed and measured, said pair of sensing and generating means defining generally parallel spaced apart light sensitive axes lying in a common plane and being responsive to impingement of a planar beam of light across said axes for generating a pair of output signals each representative of the magnitude and direction of displacement of the positions of impingement of said planar light beam across said axes relative to given zero rest positions on said axes such that measurement of either translational motion or rotational motion of the object with respect to an imaginary axis extending through said zero rest positions of and perpendicular to said sensitive axes can be derived therefrom; and (b) means for generating a stationary planar beam of light aligned to impinge upon said pair of sensing and generating means across said light sensitive axes thereof and along said imaginary axis extending through said zero rest positions of said sensitive axes when the object whose motion is to be sensed and measured is at rest.

2. The apparatus of claim 1 wherein said pair of sensing and generating means include a pair of elongated position sensitive detectors mountable in spaced relation to one another and in a common plane the object.

3. The apparatus of claim 2 wherein each of said detectors define said light sensitive axis and a pair of electrical outputs located at opposite ends of said axis.

4. The apparatus of claim 3 wherein each detector is responsive to impingement of said planar beam of light across said axis for generating an electrical current in said each detector which is divided proportionally between said outputs, depending upon the position of said impingement of said planar light beam along said axis between said outputs, to produce a pair of input current signals at said outputs of each detector.

5. The apparatus of claim 4 wherein said pair of sensing and generating means include a pair of electrical circuits each having a pair of inputs coupled to said outputs of one of said position sensitive detectors for receiving said pairs of input signals from said detectors and transforming them into said pair of output signals.

6. The apparatus of claim 5 wherein each of said electrical circuits includes a pair of trans-impedance amplifiers for translating said input current signals to first and second primary intermediate voltage signals.

7. The apparatus of claim 6 wherein each of said electrical circuits also includes a summing amplifier for adding said primary intermediate voltage signals to produce a first secondary intermediate voltage signal representing the sum of said primary intermediate voltage signals.

8. The apparatus of claim 7 wherein each of said electrical circuits further includes a voltage divider for subtracting said primary intermediate voltage signals to produce a second secondary intermediate voltage signal representing the difference of said primary intermediate voltage signals and for receiving said first and second secondary intermediate voltage signals and dividing said second secondary intermediate signal by said first secondary intermediate signal to produce said output signal.

9. An object motion sensing and measuring apparatus, comprising:

(a) first and second pairs of light position sensing and signal generating means mountable on an object whose motion is to be sensed and measured, each of said pairs of sensing and generating mean defining generally parallel spaced apart light sensitive axes lying in a common plane, said common plane of said first pair of sensing and generating means being disposed in orthogonal relation to said common plane of said second pair of sensing and generating means, said spaced apart axes of each pair of said sensing and generating means being responsive to impingement of a planar beam of light across said axes for generating a pair of output signals each representative of the magnitude and direction of displacement of the positions of impingement of said planar light beam across said sensitive axes relative to given zero rest positions on said axes such that separate measurement of translational motion and rotational motion of the object with respect to a pair of generally parallel imaginary axes within said respective common planes extending respectively through said zero rest positions of and perpendicular to said sensitive axes can be derived therefrom; and (b) means for generating a pair of stationary planar beams of light aligned to impinge upon said pairs of sensing and generating means across said light sensitive axe thereof and along said imaginary axesextending through said zero rest positions of said sensitive axes when the object whose motion is to be sensed and mesured is at rest.

10. The apparatus of claim 9 further comprising:
a pair of generally planar circuitboards mountingrespectively said first and second pairs of sensing and generating means.

11. The apparatus of claim 9 wherein each of said first and second pairs of sensing and generating means include a pair of elongated poition sensitive detectors mounted in spaced relation to one another and in a common plane on the object.

12. The apparatus of claim 10 further comprising:
a mounting platform adapted for attachment to the object and to support said circuitboards in orthogonal relation to one another so as define said orthogonallydisposed common planes.

13. The apparatus of claim 11 wherein each of said detectors define said light sensitive axis and a pair of electrical outputs located at opposite ends of said axis.

14. The apparatus of claim 13 wherein each detector is responsive to impingement of said planar beam of light across said axis for generating an electrical current in said each detector which is divided proportionally between said outputs, depending upon the position of said impingement of said planar light beam along said axis between said outputs, to produce a pair of input current signals at said outputs of each detector.

15. The apparatus of claim 14 wherein each of said sensing and generating means include a pair of electrical circuits each having a pair of inputs coupled to said outputs of one of said position sensitive detectors for receiving said pairs of input signals from said detectors and transforming them into said pair of output signals.

* * * * *